UNITED STATES PATENT OFFICE.

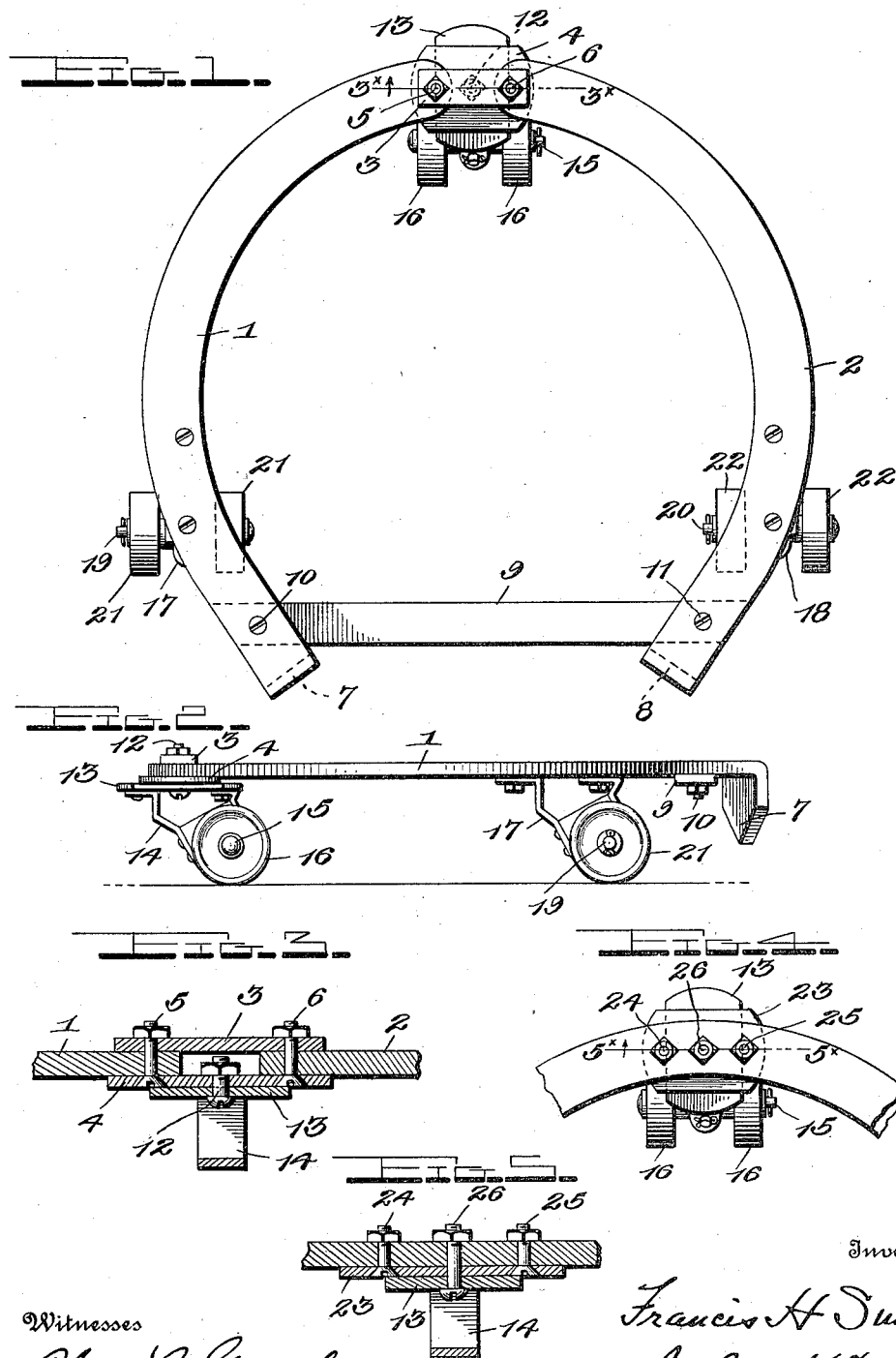

FRANCIS H. SMITH, OF ST. MARY, KENTUCKY, ASSIGNOR TO SIDNEY B. SMITH, OF ANNADEL, TENNESSEE.

TRUCK.

1,092,544.  Specification of Letters Patent.  Patented Apr. 7, 1914.

Application filed August 19, 1913. Serial No. 785,587.

*To all whom it may concern:*

Be it known that I, FRANCIS H. SMITH, a citizen of the United States, residing at St. Mary, in the county of Marion and State of Kentucky, have invented certain new and useful Improvements in Trucks, of which the following is a specification.

The object of this invention is to provide a simple, inexpensive, and efficient truck for transporting boxes, barrels and other articles in stores, warehouses, and other places where it may be useful.

In order to more fully describe my said invention, reference will be had to the accompanying drawings wherein:

Figure 1, represents a top plan view of one form of my improved truck; Fig. 2, a side elevation thereof; Fig. 3, a fragmentary section on an enlarged scale, taken on line $3^\times$—$3^\times$ Fig. 1, looking in the direction of the arrow; Fig. 4, a fragmentary top plan view of a modified form of my said truck, and Fig. 5, an enlarged fragmentary section on line $5^\times$—$5^\times$ Fig. 4, looking in the direction of the arrow.

My improved truck, in the forms herein shown, comprises among other parts a frame of substantially horse-shoe shape in top plan, said frame in the form shown in Figs. 1, 2, and 3 comprising two relatively movable members 1 and 2 having a hinged connection consisting of two plates 3 and 4 held on opposite sides of the members 1 and 2 by bolts 5 and 6. The plates 3 and 4, and bolts 5 and 6, permit the members 1 and 2 to move relatively to each other in the plane of the paper Fig. 1, or in a horizontal plane when the truck is placed upon a horizontal floor. The members 1 and 2 terminate at their rear ends in downwardly extending spurs 7 and 8, and connecting said members near said ends is a cross-bar 9 detachably secured thereto by bolts 10 and 11. The plate 4 is somewhat broader than the plate 3, and carries a king bolt 12 which forms a pivot for a plate 13, which latter is made fast to a roller bracket 14, the plate 13 forming a bearing for plate 14. This bracket carries a shaft 15 on which are mounted two rollers 16. In the drawings I have shown a bracket and roller construction well known in the roller-skate art, wherein the shaft which carries the rollers may tilt in a vertical plane. This is a well known construction, and need not be here further described.

Secured rigidly to the members 1 and 2 on their lower sides a short distance in advance of their rear ends, are two roller brackets 17 and 18 which carry shafts 19 and 20, and on these shafts are mounted rollers 21 and 22 respectively, all similar to the aforesaid bracket and rollers.

In Figs. 4 and 5, I have shown a modified form of my truck in which the frame members 1 and 2 instead of being hinged or relatively movable are made continuous, in which case a bearing plate 23 similar to plate 4 is secured by bolts 24 and 25 fast to the lower side of the truck frame. A king bolt 26 passing through plate 21 and the main frame of the truck forms a pivot to the roller bracket 14.

The hinged construction of the form of my truck shown in Figs. 1, 2, and 3, has the advantage of permitting the truck to be folded into a small space for transportation or for other purposes, and has the further advantage of permitting the rollers 16 to more readily track in the desired direction. By giving the box, barrel, or other article on the truck a twisting movement in the direction required, the members 1 and 2, acting through plate 4, shift the rollers 16 about their vertical pivot 12 in a corresponding direction.

The spurs 7 and 8 are for the purpose of preventing the truck from rolling about when loading or unloading it, and may be sent into engagement with the floor by pressing on the cross-bar 9 with the foot, or by the weight of the load over the ends of the frame.

The truck herein described may be made in various sizes. In the preferred form, however, the frame of the truck is supported about three inches above the floor level, and the rollers about the size usually employed in roller-skates. A convenient size of frame for general purposes would be about seventeen inches at its greatest transverse diameter. The members 1 and 2 may be an inch and a quarter broad and a quarter of an inch thick, and are preferably made of iron.

With a truck of this kind boxes, barrels, and other objects may be very readily loaded on and taken therefrom, and shifted from one point to another. Moreover, the simplicity of the construction of the truck enables it to be manufactured and sold at a very small cost.

Without limiting myself to the specific construction herein shown, what I claim is:

1. A truck comprising a frame having two rearwardly extending members each having a downwardly extending spur, a cross-bar connecting said members, roller brackets attached to the lower side of said frame, and rollers carried by said brackets.

2. A truck comprising a substantially horse-shoe shaped frame, downwardly extending spurs formed on the ends of said frame, a cross-bar connecting the sides of said frame adjacent its spur ends, a bracket pivotally secured to said frame at its apex, and two brackets secured to said frame, one beneath each arm thereof rearward of the first named bracket, and rollers mounted in said brackets.

3. A truck comprising a frame having two hinged members each terminating at the rear of the truck in a downwardly extending spur, a cross-bar connecting said members adjacent their spur ends, a plurality of brackets secured to the lower side of said frame, and rollers mounted in said brackets.

4. A truck comprising a frame having two relatively movable members, a link member pivotally secured to each of said members, a pivot carried by said link member, a bracket secured to said pivot for angular movement, a roller mounted in said bracket, a bracket secured to the lower side of each of said relatively movable frame members, and rollers mounted in each of said brackets.

In testimony whereof I affix my signature in presence of two witnesses.

FRANCIS H. SMITH.

Witnesses:
SAM J. SPALDING,
C. C. PHILLIPS.

---

Copies of this patent may be obtained for five cents each, by addressing the "Commissioner of Patents, Washington, D. C."